US012684636B2

(12) United States Patent
Dong

(10) Patent No.: US 12,684,636 B2
(45) Date of Patent: Jul. 14, 2026

(54) WIRELESS COMMUNICATION METHOD, COMMUNICATION DEVICE

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 516 days.

(21) Appl. No.: 18/013,660

(22) PCT Filed: Jul. 17, 2020

(86) PCT No.: PCT/CN2020/102784
§ 371 (c)(1),
(2) Date: Dec. 29, 2022

(87) PCT Pub. No.: WO2022/011702
PCT Pub. Date: Jan. 20, 2022

(65) Prior Publication Data
US 2023/0180321 A1      Jun. 8, 2023

(51) Int. Cl.
*H04W 76/15*      (2018.01)
*H04W 76/11*      (2018.01)
*H04W 88/08*      (2009.01)

(52) U.S. Cl.
CPC ............ *H04W 76/15* (2018.02); *H04W 76/11* (2018.02); *H04W 88/08* (2013.01)

(58) Field of Classification Search
CPC ...... H04W 76/15; H04W 76/11; H04W 88/08
See application file for complete search history.

(56) References Cited

U.S. PATENT DOCUMENTS

2014/0307726 A1*  10/2014  Kang ................... H04L 12/189
370/338
2021/0266931 A1*  8/2021  Kwon ................ H04W 60/005

FOREIGN PATENT DOCUMENTS

CN            103763742 A  *  4/2014
WO    WO-2021011476 A1 *  1/2021  ............ H04W 76/15

OTHER PUBLICATIONS

European Patent Application No. 20945098.0 Search and Opinion dated Mar. 21, 2024, 11 pages.
Chitrakar et al. "Multi-link Setup clarifications" doc.: IEEE 802.11-20/0751r0, May 2020, 18 pages.
PCT/CN2020/102784, International Search Report and Written Opinion dated Apr. 6, 2021, 7 pages.
PCT/CN2020/102784, English translation of International Search Report and Written Opinion dated Apr. 6, 2021, 8 pages.
Kwon, H.K. et al., "MLO: AID Allocation", IEEE Draft; 11-20-0770r1, Apr. 28, 2020 pp. 1-8.

* cited by examiner

*Primary Examiner* — Saad A. Waqas
(74) *Attorney, Agent, or Firm* — Cozen O'Connor

(57) ABSTRACT

A wireless communication method and a communication device includes: receiving an association identifier (AID) via a first link; generating a multi-link set-up request frame, and sending the multi-link set-up request frame via a second link or the first link, in which the multi-link set-up request frame includes the AID.

12 Claims, 2 Drawing Sheets receiving an AID on a first link                    201 generating a multi-link set-up request frame, and sending the multi-link set-up request frame on a second link or the first link                    202

WIRELESS COMMUNICATION METHOD, COMMUNICATION DEVICE

CROSS REFERENCE TO RELATED APPLICATIONS

This application is a national phase application based on International Application No. PCT/CN2020/102784, filed Jul. 17, 2020, the entire content of which is incorporated by reference for all purposes.

TECHNICAL FIELD

The disclosure relates to the field of wireless communication technologies, and more particularly, to a method wireless communication and a communication device.

BACKGROUND

In the case when a Wi-Fi communication device supports multi-link, an access point (AP) and a station (STA) are multi-link device (MLD) type. However, an association identifier (AID) is only assigned for the STA during an initial association, that is, it is assigned under an initial link of an association. Nothing in the prior art addressed issues on how to apply the AID to multi-link scenarios.

SUMMARY

The present disclosure provides a wireless communication method, a communication device.

According to a first aspect of embodiments of the present disclosure, there is provided a wireless communication method. The method includes:

receiving an association identifier (AID) on a first link;

generating a multi-link set-up request frame, and sending the multi-link set-up request frame on a second link or the first link, in which the multi-link set-up request frame includes the AID.

According to a second aspect of embodiments of the disclosure, there is provided a wireless communication method. The method includes:

receiving an initial link set-up message frame on a first link; sending an AID on the first link in response to the initial link set-up message frame; in which the initial link set-up message frame is configured to indicate that a sender of the initial link set-up message frame supports a capability of multi-link communication.

According to a third aspect of embodiments of the disclosure, there is provided a communication device. The communication device includes a processor, a transceiver, a memory and an executable program stored on the memory and capable of being run by the processor. When running the executable program, the processor is configured to implement: receiving an association identifier (AID) via a first link; generating a multi-link set-up request frame, and sending the multi-link set-up request frame via a second link or the first link, in which the multi-link set-up request frame includes the AID.

BRIEF DESCRIPTION OF THE DRAWINGS

The accompanying drawings, which are incorporated in and constitute a part of this specification, illustrate embodiments consistent with the disclosure, and serve to explain the principle of the disclosure together with the description.

DETAILED DESCRIPTION

Embodiments will be described in detail herein, examples of which are illustrated in the accompanying drawings. When the following description refers to the accompanying drawings, the same or similar elements may be denoted by the same numerals in different accompanying drawings, unless otherwise indicated. The implementations described in the following exemplary embodiments do not represent all implementations consistent with the present disclosure. Instead, they are merely examples of apparatuses and methods consistent with some aspects of the disclosure as described in the appended claims.

The terms in embodiments of the present disclosure are only for the purpose of describing specific embodiments, and are not intended to limit embodiments of the present disclosure. The singular forms of "a", "said" and "the" in embodiments of the present disclosure and appended claims are also intended to include plural forms, unless the context clearly indicates other meanings. It should also be understood that the term "and/or" as used herein refers to and includes any or all possible combinations of one or more associated listed items.

It should be understood that although the terms first, second and third may be used in embodiments of the present disclosure to describe various information, the information should not be limited to these terms. These terms are only used to distinguish the same type of information from each other. For example, without departing from the scope of the present disclosure, the first information may also be referred to as the second information, and similarly, the second information may also be referred to as the first information. In different contexts, the term "if" used herein is interpreted as "when" or "upon" or "in response to determining".

An implementation subject of embodiments of the present disclosure may include, but not limited to, a terminal device in a wireless local area network system, such as a mobile phone, a router in the wireless local area network system, etc.

Figure 1:
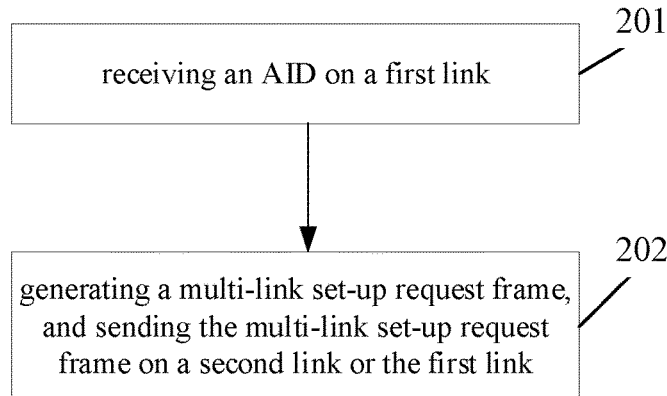
FIG. 1 is a flow chart illustrating a wireless communication method according to an embodiment.

FIG. 1 is a flow chart illustrating a wireless communication method according to an exemplary embodiment. As illustrated in FIG. 1, the wireless communication method of embodiments of the present disclosure may include the following processing steps.

At step 201, an AID is received on a first link.

In an embodiment of the present disclosure, an initial link set-up message frame is sent on the first link. The initial link set-up message frame is used to indicate that a sender of the initial link set-up message frame supports a capability of multi-link communication. The initial link set-up message frame sent by a STA (station) may be an association request frame or a probe request frame, etc. The initial link set-up message frame sent by an AP (access point) may be a beacon frame, a probe response frame or an association response frame. That is, the sender of the initial link set-up message frame is a STA MLD device (also known as non-AP MLD device), or an AP MLD device.

The first link may be an initial association link set up between the SAT and the AP. The initial association link may be initiated by the STA. Illustratively, the above step may include one or more of the following sub-steps. For example, ① the STA sends an association request frame or a probe request frame to the AP in a process of initial access, ② the STA exchanges with the AP a capability information value of the STA supporting multi-link communication, ③ the AP replies to the STA with an association response frame, and the association response frame carries an AID assigned to the STA, and a capability information value of the AP supporting multi-link communication. In one aspect, each of the above sub-steps ①, ②, and ③ is optional, that is, each sub-step may be used alone or in combination, and may also be used alone or in combination with other steps, which will not be limited in embodiments of the present disclosure.

At step 202, a multi-link set-up request frame is generated, and the multi-link set-up request frame is sent on a second link or the first link.

The multi-link set-up request frame may include the AID.

In an embodiment, the multi-link set-up request frame may be sent on a second link or the first link. In one aspect, the second link may be a single link different from the first link. For example, the first link is a link in a 2.4 GHz frequency band, the second connection may be a link in a 5.8 GHz or 6-7 GHz frequency band. Alternatively, the first link is a link in the 2.4 GHz frequency band, the second link may be a single carrier frequency band link in the 5.8 GHz or 6-7 GHz frequency band. In some embodiments of the present disclosure, one or more second links may be set.

In some embodiments of the present disclosure, the multi-link set-up request frame may include at least one piece of link identifier information.

As an implementation, the at least one piece of link identifier information in the multi-link set-up request frame may further include an MAC address of each link. That is, a piece of link identifier information corresponds an MAC address.

An example of relevant information included in the multi-link set-up request frame is shown in Table 1. A Link set field is used for indicating all links in multiple links to be established currently, and an AID field is used for the AID for all links supported by the STA after the STA receives the AID assigned by the AP on the first link.

TABLE 1

| Link set | AID | MAC address 1 | MAC address 2 | MAC address 3 | . . . |
|---|---|---|---|---|---|

In an embodiment of the present disclosure, the value of the Link set field may be a bitmap with a plurality of bits, and the bitmap is configured to identify to-be-activated link(s).

In some embodiments, each bit of the Link set field corresponds to one link, and a value of the bit is configured to identify whether the corresponding link is to be activated.

For example, the value of the Link set field is a bitmap with 8 bits, and the 8 bits correspond to 8 links. When the value of the Link set field is set as "00000111", it is indicated that a 6th link, a 7th link, and an 8th link of the STA are to be activated, and MAC addresses respectively corresponding to the 6th link, the 7th link, and the 8th link are carried behind the AID field, for example, MAC address 1, MAC address 2, MAC address 3 as shown in Table 1. Among identification bits corresponding to the Link set field, each identification bit in a sequence represents a symbol of a link supported by the STA. When any identification bit in the sequence is set as "1", it is indicated that the corresponding link is to be activated. When any identification bit in the sequence is set as "0", it is indicated that the corresponding link is not to be activated. A 2nd link, a 3rd link, and a 5th link supported by the STA are to be activated, the value of the Link set field is set as "01101000". Certainly, "1" may also be used to indicate that the corresponding link is not to be activated, while "0" may also be used to indicate that the corresponding link is to be activated, which will not be limited in embodiments of the present disclosure.

In other embodiments, values corresponding to all or part of the bits of Link set represent the corresponding links. For example, the value of the Link set field is a bitmap with 4 bits, and the bitmap may indicate values range from 0 to 15, which may correspond to a maximum of 16 different link combinations. Both the sender and receiver know in advance which links are included in each link combination of the link combinations. For example, when the value of the Link set field is set as "0001", links in a first link combination are to be activated. When the value of the Link set field is set as "0100", links in a fourth link combination are to be activated. When the value of the Link set field is set as "0110", links in a sixth link combination are to be activated.

As another implementation, the multi-link set-up request frame may include:

at least one piece of link identifier information and at least one media access control (MAC) address corresponding to the at least one piece of link identifier information.

In an embodiment of the disclosure, links to be activated may be notified to the AP through an association between link identifiers and corresponding MAC addresses. As illustrated in the following Table 2, when the 2nd link, the 3rd link and the 5th link which are supported by the STA are to be activated, the multi-link set-up request frame may carry link identifier 2, link identifier 3, link identifier 5 and a MAC address corresponding to each link identifier. The AP may activate multiple links between the AP and the STA based on a correspondence between link identifiers and MAC addresses.

TABLE 2

| Link identifier 2 | MAC address 2 | Link identifier 3 | MAC address 3 | Link identifier5 | MAC address 5 | . . . | AID |
|---|---|---|---|---|---|---|---|

In an embodiment of the present disclosure, the STA may send a multi-link set-up request frame on a first link. Specifically, the STA may send the initial link set-up message frame on a first link. The initial link set-up message frame includes at least one link identifier. In some embodiments, the initial link set-up message frame does not include a MAC address corresponding to the first link. Certainly, this is a possible implementation. In other embodiments, the initial link set-up message frame may include the MAC address corresponding to the first link.

The multi-link set-up request frame in an embodiment of the present disclosure includes at least one link identifier or a correspondence between at least one link identifier and corresponding MAC address(es). In a case that multiple links are set up between the STA and the AP, since the first link has been set up in a process of the initial association link, and the first link is in an active state, the multi-link set-up request frame doesn't include an identifier of the first link and the MAC address corresponding to the first link. That is, the MAC address of the at least one link included in the multi-link set-up request frame is different from the MAC address corresponding to the first link.

In a case that the at least one piece of link identifier information includes two or more pieces of link identifier information, different link identifiers in the two or more pieces of link identifier information correspond to different MAC addresses.

It should be noted that in embodiments of the present disclosure, the STA initiating the initial association link to the AP is taken as an example, embodiments of the present disclosure may also support the AP initiating the initial association link to the STA. For example, an AP broadcasts relevant information to at least one STA, a STA receiving the relevant information broadcasted may set up the initial association link with the AP. The solution of the AP initiating the initial association link to the STA may correspond to the solution of the STA initiating the initial association link to the AP, which will not be repeated herein.

In an embodiment of the present disclosure, the STA is a non-access point multi-link device (non-AP MLD), for example, may be a mobile phone terminal, a game console, a television, a refrigerator, an air conditioner and other household appliances. The AP is an access point multi-link device (AP MLD), and may be an access hotspot, such as a router supporting multi band access and other wireless devices.

Figure 2:
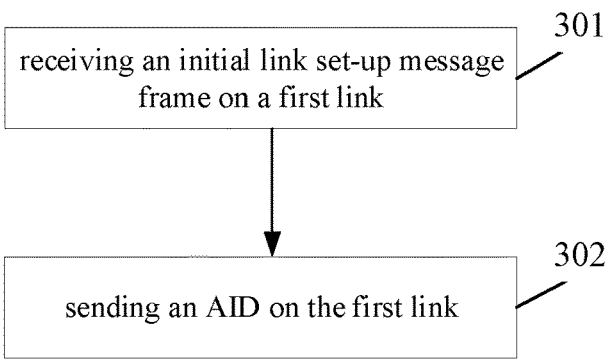
FIG. 2 is a flow chart illustrating a wireless communication method according to an embodiment.

FIG. 2 is a flow chart illustrating a wireless communication method according to an exemplary embodiment. As illustrated in FIG. 2, the wireless communication method of embodiments of the present disclosure may include the following processing steps.

At step 301, an initial link set-up message frame is received on a first link.

In an embodiment of the present disclosure, the initial link set-up message frame may include an association request frame or a probe request frame, etc. The first link may be an initial association link set up between a SAT and an AP. The initial association link may be initiated by the STA. For example, the STA sends an association request frame or a probe request frame to the AP in a process of initial access, and the AP receives the association request frame or the probe request frame sent by the STA on the first link. The AP and the STA exchange a capability information value of supporting multi-link communication with each other.

The initial link set-up message frame is used to indicate that a sender of the initial link set-up message frame supports a capability of multi-link communication.

At step 302, an AID is sent on the first link.

As an example, the AP may reply to the STA with an association response frame after receiving the initial link set-up message frame sent by the STA. The association response frame may carry an AID assigned to the STA, and a capability information value of the AP supporting multi-link communication. In some embodiments, the AID may be sent based on the initial link set-up message frame, or may also be sent without being based on the initial link set-up message frame.

In the above embodiments, an order of the step 301 and step 302 may be interchanged to each other, which will not be limited in embodiments of the present disclosure.

In an embodiment of the present disclosure, the wireless communication method of embodiments of the present disclosure may further include: receiving the multi-link set-up request frame on a second link or the first link, and setting up multiple links based on the capability of multi-link communication supported by the sender of the initial link set-up message frame.

In an embodiment of the present disclosure, the AP may receive the multi-link set-up request frame on the second link or the first link. Specifically, the second link may be a single link different from the first link. For example, the first link is a link in a 2.4 GHz frequency band, the second connection may be a link in a 5.8 GHz or 6-7 GHz frequency band. Alternatively, the first link is a link in the 2.4 GHz frequency band, the second link may be a single carrier frequency band link in the 5.8 GHz or 6-7 GHz frequency band.

In embodiments of the present disclosure, the multi-link set-up request frame may include at least one piece of link identifier information.

As an implementation, the at least one piece of link identifier information in the multi-link set-up request frame may further include an MAC address of each link. That is, a piece of link identifier information corresponds an MAC address.

In an embodiment of the present disclosure, a value of a Link set field may be a bitmap with a plurality of bits, and the bitmap is configured to identify to-be-activated link(s).

In some embodiments, each bit of the Link set field corresponds to one link, and a value of the bit is configured to identify whether the corresponding link is to be activated. For example, the value of the Link set field is a bitmap with 8 bits, and the 8 bits correspond to 8 links. When the value of the Link set field is set as "00000111", it is indicated that a 6th link, a 7th link, and an 8th link of the STA are to be activated, and MAC addresses respectively corresponding to the 6th link, the 7th link, and the 8th link are carried behind the AID field, for example, MAC address 1, MAC address 2, MAC address 3 as shown in Table 1. Among identification bits corresponding to the Link set field, each identification bit in a sequence represents a symbol of a link supported by the STA. When any identification bit in the sequence is set as "1", it is indicated that the corresponding link is to be activated. When any identification bit in the sequence is set as "0", it is indicated that the corresponding link is not to be activated. In a case that a 2nd link, a 3rd link, and a 5th link which are supported by the STA are to be activated, the value of the Link set field is set as "01101000". Certainly, "1" may represent not to be activated, while "0" may also represent to be activated, which will not be limited in embodiments of the present disclosure.

In other embodiments, values corresponding to all or part of the bits of Link set represent the corresponding links. For example, the value of the Link set field is a bitmap with 4 bits, and the bitmap may indicate values range from 0 to 15, which may correspond to a maximum of 16 different link combinations. Both the sender and receiver know in advance which links are included in each link combination of the link combinations. For example, when the value of the Link set field is set as "0001", links in a first link combination are to be activated. When the value of the Link set field is set as "0100", links in a fourth link combination are to be activated. When the value of the Link set field is set as "0110", links in a sixth link combination are to be activated.

As another implementation, the multi-link set-up request frame may include at least one piece of link identifier information and at least one media access control (MAC) address corresponding to the at least one piece of link identifier information.

In an embodiment of the disclosure, links to be activated may be notified to the AP through an association between link identifiers and corresponding MAC addresses. As illustrated in Table 2, when the 2nd link, the 3rd link and the 5th link which are supported by the STA are to be activated, the multi-link set-up request frame may carry link identifier 2, link identifier 3 and link identifier 5 and their corresponding MAC addresses. The AP may activate multiple links between the AP and the STA based on a correspondence between link identifiers and MAC addresses.

In an embodiment of the present disclosure, the wireless communication method of embodiments of the present disclosure may further include: setting up multiple links based on the at least one piece of link identifier information, or the at least one piece of link identifier information and the at least one media access control (MAC) address corresponding to the at least one piece of link identifier information in the multi-link set-up request frame.

The at least one MAC address corresponding to the at least one piece of link identifier information is different from a MAC address corresponding to the first link. Or, in a case that the at least one piece of link identifier information includes two or more pieces of link identifier information, different pieces of link identifier information correspond to different MAC addresses.

In an embodiment of the present disclosure, the wireless communication method of embodiments of the present disclosure may further include: receiving the initial link set-up message frame on the first link, and the initial link set-up message frame includes at least one piece of link identifier information. In some embodiments, the initial link set-up message frame does not include the MAC address corresponding to the first link. Certainly, this is a possible implementation. In other embodiments, the initial link set-up message frame may include the MAC address corresponding to the first link.

The implementation of the technical solution of embodiment of the present disclosure is further illustrated through a specific example below.

In an embodiment of the present disclosure, in a process of setting up multi-link, that is, in a process of activating links, a multi-link set-up request frame sent by a STA to an AP carries identification bits, indicating that multiple links related to an AID sent by a single link are activated in multiple links.

As an implementation, during a process of initial access (association request/probe request), the STA of a Non-AP MLD exchanges with the AP of a MLD a capability information value of the STA supporting multi-link communication. An association response frame replied by the AP carries an AID assigned to the STA of the Non-AP MLD and a capability information value of the AP supporting multi-link communication. When both the STA and the AP receive the capability information value of supporting multi-link communication, it implicitly means that when the AP and the station set up multiple links, the AID may be applied under links to be setup, namely, links to be activated, and the STA of the Non-AP MLD may support multi-link communication, but the links to be activated may be a subset of multiple links or a universal set including the initial associated link, or the AID assigned by the AP under a single link may be applied under links supported by the STA of the Non-AP MLD.

Alternatively, as an implementation, the AP and the STA have set up an initial association under a single link, and the AP has assigned an AID to the STA under this link. In order to make the AID adapt to a conclusion in 802.11be that "When a non-AP MLD made a multi-link setup with an AP MLD, one AID is assigned to the non-AP MLD across all links", it is required to make the MLD AP and the STA of the Non-AP MLD use the same AID under respective links in a process of setting up multiple links. Since the 802.11be also has the following conclusion that "802.11be supports that if different affiliated APs of an AP MLD have different MAC addresses, then different affiliated non-AP STAs of a non-AP MLD with more than one affiliated STA have different MAC addresses", the AID may be specifically applied to the process of setting up multiple links between the STA and the AP in the following way. The multi-link set-up request frame carries an AID, and information elements corresponding to links and MAC addresses under respective links. The details may be as follows.

The multi-link set-up request frame may further include at least one piece of link identifier information in addition to including the AID.

As an implementation, the at least one piece of link identifier information in the multi-link set-up request frame may further include an MAC address of each link.

An example of relevant information included in the multi-link set-up request frame is shown in Table 1. A Link set filed denotes all links in multiple links to be set up currently, and an AID filed denotes an AID used as the AID of all links supported by the STA after the STA receives the AID assigned by the AP on the first link. when the value of the Link set field is set as "00000111", it is indicated that a 6th link, a 7th link, and an 8th link of the STA are to be activated, and MAC addresses respectively corresponding to the 6th link, the 7th link, and the 8th link are carried behind the AID field. Among identification bits corresponding to the Link set field, each identification bit in a sequence represents a symbol of a link supported by the STA. When any identification bit in the sequence is set as "1", it is indicated that the corresponding link is to be activated. When any identification bit in the sequence is set as "0", it is indicated that the corresponding link is not to be activated. A 2nd link, a 3rd link, and a 5th link supported by the STA are to be activated, the value of the Link set field is set as "01101000".

As another implementation, the multi-link set-up request frame may include at least one piece of link identifier information and at least one media access control (MAC) address corresponding to the at least one piece of link identifier information.

In an embodiment of the disclosure, links to be activated may be notified to the AP through an association between link identifiers and corresponding MAC addresses. As illustrated in Table 2, when the 2nd link, the 3rd link and the 5th link which are supported by the STA are to be activated, the multi-link set-up request frame may carry link identifier 2, link identifier 3 and link identifier 5 and a MAC address corresponding to each link identifier. The AP may activate multiple links between the AP and the STA based on a correspondence between link identifiers and MAC addresses.

Figure 3:
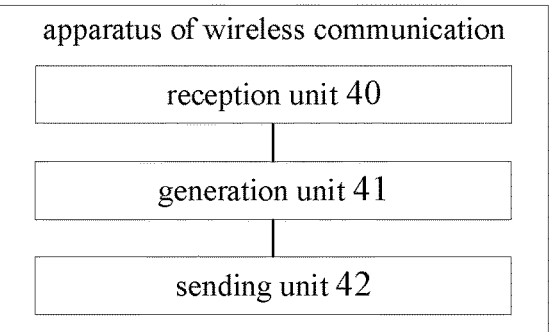
FIG. 3 is a block diagram illustrating a structure of a wireless communication apparatus according to an embodiment.

FIG. 3 is a block diagram illustrating a structure of a wireless communication apparatus according to an exemplary embodiment. As illustrated in FIG. 3, the wireless communication apparatus of an embodiment of the present disclosure may include a reception unit 40, a generation unit 41 and a sending unit 42.

The reception unit 40 is configured to receive an association identifier (AID) on a first link.

The generation unit 41 is configured to generate a multi-link set-up request frame, in which the multi-link set-up request frame includes the AID.

The sending unit 42 is configured to send the multi-link set-up request frame on a second link or the first link.

In an embodiment, the sending unit 42 is further configured to:

send an initial link set-up message frame on the first link, in which the initial link set-up message frame is configured to indicate that a sender of the initial link set-up message frame supports a capability of multi-link communication.

In an embodiment, the multi-link set-up request frame may further include: at least one piece of link identifier information; or at least one piece of link identifier information and at least one media access control (MAC) address corresponding to the at least one piece of link identifier information.

In an embodiment, the at least one MAC address corresponding to the at least one piece of link identifier information is different from an MAC address corresponding to the first link; or in a case that the at least one piece of link identifier information includes two or more pieces of link identifier information, MAC addresses corresponding to the two or more pieces of link identifier information are different In an embodiment, the sending unit 42 is further configured to: send an initial link set-up message frame on the first link, in which the initial link set-up message frame includes at least one piece of link identifier information and does not include an MAC address corresponding to the first link.

In an illustratively embodiment, the reception unit 40, generation unit 41 and the sending unit 42 may be implemented by one or more central processing units (CPUs), graphics processing units (GPUs), base processors (BP), application specific integrated circuits (ASICs), digital signal processings (DSPs), programmable logic devices (PLDs), complex programmable logic devices (CPLDs), field-programmable gate arrays (FPGAs), general processors, controllers, micro controller units (MCUs), microprocessors, or other electronic components, or implemented by one or more radio frequency (RF) antennas, to perform the steps of the wireless communication method according to the foregoing embodiments.

In an embodiment of the present disclosure, a specific mode of each unit for performing operations in the wireless communication apparatus illustrated in FIG. 3 has been described in detail in the method embodiments, which will not be described in detail herein.

Figure 4:
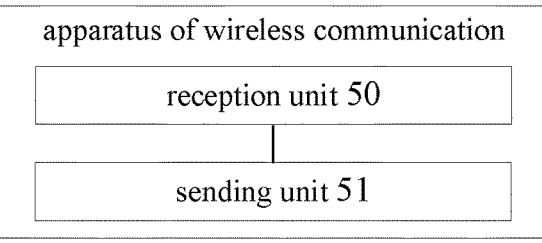
FIG. 4 is a block diagram illustrating a structure of an apparatus of wireless communication according to an embodiment.

FIG. 4 is a block diagram illustrating a structure of a wireless communication apparatus according to an exemplary embodiment. As illustrated in FIG. 4, the wireless communication apparatus of an embodiment of the present disclosure may include a reception unit 50 and a sending unit 51.

The reception unit 50 is configured to receive an initial link set-up message frame on a first link, in which the initial link set-up message frame is configured to indicate that a sender of the initial link set-up message frame supports a capability of multi-link communication;

The sending unit 51 is configured to send an AID on the first link in response to the initial link set-up message frame.

In an embodiment, the apparatus further includes a set-up unit.

The reception unit 50 is further configured to receive the multi-link set-up request frame on a second link or the first link.

The set-up unit is configured to set up multiple links based on the capability of multi-link communication supported by the sender of the initial link set-up message frame.

In an embodiment, the multi-link set-up request frame includes at least one piece of link identifier information; or at least one piece of link identifier information and at least one media access control (MAC) address corresponding to the at least one piece of link identifier information.

The set-up unit is further configured to set up multiple links based on the at least one piece of link identifier information, or the at least one piece of link identifier information and the at least one media access control (MAC) address corresponding to the at least one piece of link identifier information in the multi-link set-up request frame.

In an embodiment, the at least one MAC address corresponding to the at least one piece of link identifier information is different from an MAC address corresponding to the first link; or in a case that the at least one piece of link identifier information includes two or more pieces of link identifier information, the MAC addresses corresponding to the two or more pieces of link identifier information are different.

In an embodiment, the reception unit is configured to receive the initial link set-up message frame on the first link, in which the initial link set-up message frame includes at least one piece of link identifier information and does not include an MAC address corresponding to the first link.

In an illustratively embodiment, the reception unit 50, the sending unit 51 and the set-up unit may be implemented by one or more central processing units (CPUs), graphics processing units (GPUs), base processors (BP), application specific integrated circuits (ASICs), digital signal processings (DSPs), programmable logic devices (PLDs), complex programmable logic devices (CPLDs), field-programmable gate arrays (FPGAs), general processors, controllers, micro controller units (MCUs), microprocessors, or other electronic components, or implemented by one or more radio frequency (RF) antennas, to perform the steps of the wireless communication method according to the foregoing embodiments.

In an embodiment of the present disclosure, a specific mode of each unit for performing operations in the wireless communication apparatus illustrated in FIG. 4 has been described in detail in the method embodiments, which will not be described in detail herein.

According to the wireless communication method and apparatus, the communication device and the storage medium provided by some embodiments of the present disclosure, with receiving the AID via the first link, generating multi-link set-up request frame based on the AID, and sending the multi-link set-up request frame via the second link or the first link, an interactive signaling overhead in a process of multi-link set-up may be reduced by making the multi links use the AID together, and providing by the STA for the AP with the multi-link identifiers, etc., the device may save power and render access more convenient.

Figure 5:
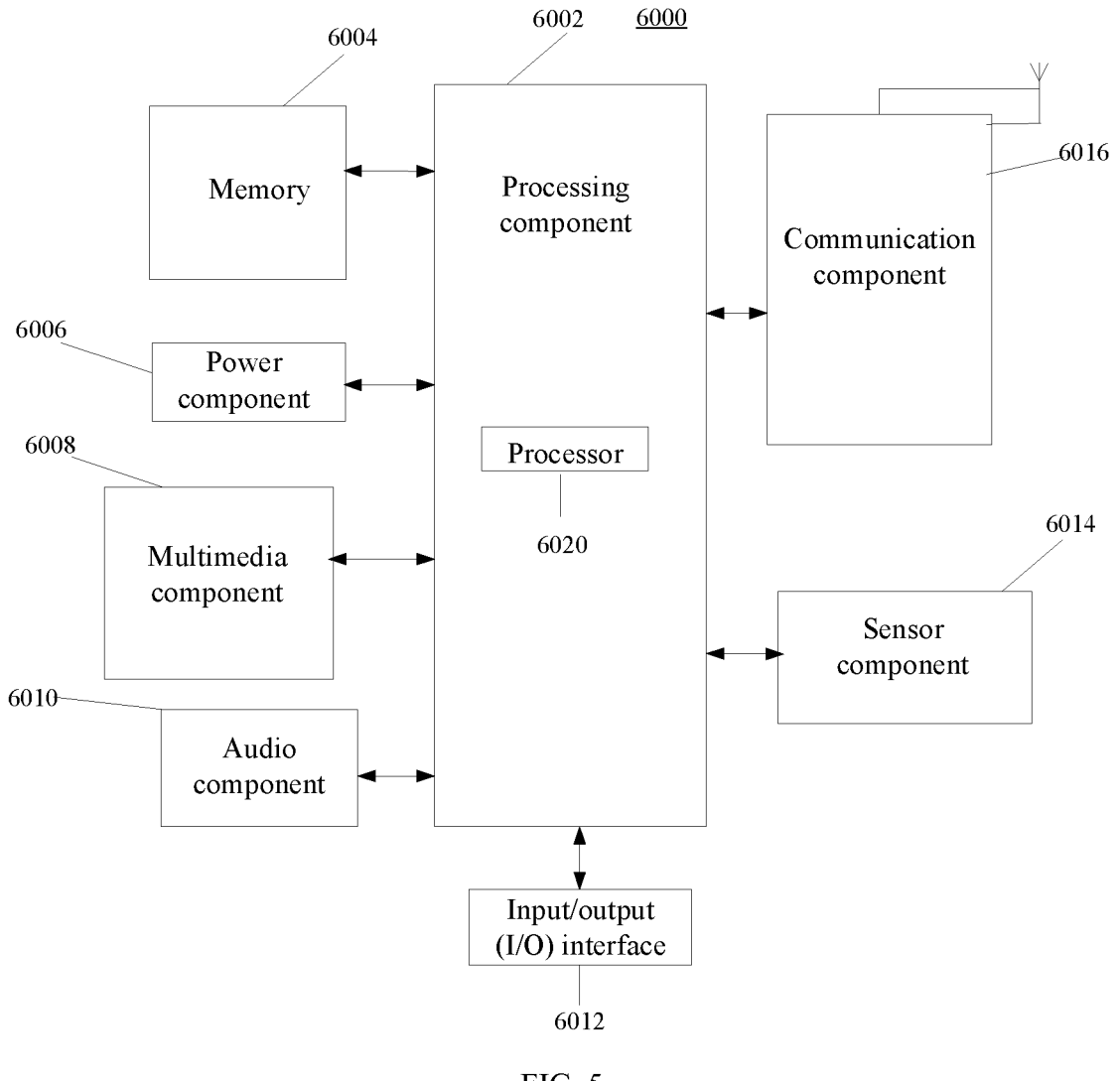
FIG. 5 is a block diagram illustrating a structure of a communication device according to an embodiment.

FIG. 5 is a block diagram illustrating a communication device 6000 according to another exemplary embodiment. For example, the device 6000 may be a mobile phone, a computer, a digital broadcasting terminal, a message trans-ceiving device, a game console, a tablet equipment, a medical equipment, a fitness equipment, or a personal digital assistant, etc.

As illustrated in FIG. 5, the device 6000 may include one or more of: a processing component 6002, a memory 6004, a power component 6006, a multimedia component 6008, an audio component 6010, an input/output (I/O) interface 6012, a sensor component 6014, and a communication component 6016.

The processing component 6002 typically controls overall operations of the device 6000, such as the operations asso-ciated with display, telephone calls, data communications, camera operations, and recording operations. The processing component 6002 may include one or more processors 6002 for executing instructions to implement all or a part of the above method. Moreover, the processing component 6002 may include one or more modules which facilitate the interaction between the processing component 6002 and other components. For example, the processing component 6002 may include a multimedia module to facilitate the interaction between the multimedia component 6008 and the processing component 6002.

The memory 6004 is configured to store various types of data to support the operation of the device 6000. Examples of such data include instructions for any application or method operated on the device 6000 for performing con-traction data, phonebook data, messages, pictures, video, etc. The memory 6004 may be implemented using any type of volatile or non-volatile memory devices, or a combination thereof, such as a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic or an optical disk.

The power component 6006 is configured to provide power to various components of the device 6000. The power component 6006 may include a power management system, one or more power sources, and any other components associated with the generation, management, and distribu-tion of power in the device 6000.

The multimedia component 6008 includes a screen pro-viding an output interface between the device 6000 and the user. In some embodiments, the screen may include a liquid crystal display (LCD) and a touch panel (TP). If the screen includes the touch panel, the screen may be implemented as a touch screen to receive an input signal from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some embodiments, the multimedia component 6008 includes a front camera and/or a rear camera. When the device 6000 is in an operation mode, such as a shooting mode or a video mode, the front camera and/or the rear camera may receive external multi-media data. Each front camera and rear camera may be a fixed optical lens system or have capabilities of focal length and optical zoom.

The audio component 6010 is configured to output and/or input an audio signal. For example, the audio component 6010 includes a microphone ("MIC") for receiving an external audio signal when the device 6000 is in an operation mode, such as a call mode, a recording mode, and a voice recognition mode. The received audio signal may be further stored in the memory 6004 or transmitted on the communication component 6016. In some embodiments, the audio component 6010 further includes a speaker for outputting the audio signal.

The I/O interface 6012 is configured to provide an inter-face between the processing component 6002 and peripheral interface modules, such as a keyboard, a click wheel, buttons, and the like. These buttons may include, but be not limited to, a home button, a volume button, a start button, and a lock button.

The sensor component 6014 includes one or more sensors for providing status assessments of various aspects of the device 6000. For example, the sensor component 6014 may detect an open/closed state of the device 6000, relative positioning of components, e.g., the display and the keypad of the device 6000, a position change of the device 6000 or a component of the device 6000, a presence or absence of user contraction with the device 6000, an orientation or an acceleration/deceleration of the device 6000, and a tempera-ture change of the device 6000. The sensor component 6014 6014 may include a proximity sensor configured to detect the presence of nearby objects without any physical contact. The sensor component 6014 may also include an optical sensor, such as a CMOS or CCD image sensor, for use in an imaging application. In some embodiments, the sensor com-ponent 6014 may also include an acceleration sensor, a gyro sensor, a magnetic sensor, a pressure sensor or a temperature sensor.

The communication component 6016 is configured to facilitate communication, wired or wirelessly, between the device 6000 and other devices. The device 6000 may access a wireless network based on a communication standard, such as Wi-Fi, 2G, 3G, or a combination thereof. In an exemplary embodiment, the communication component 6016 receives a broadcast signal or broadcast associated information from an external broadcast management system on a broadcast channel. In an exemplary embodiment, the communication component 6016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Blu-etooth (BT) technology, and other technologies.

In one or more exemplary embodiments, the device 6000 may be implemented with one or more application specific integrated circuits (ASICs), digital signal processors (DSPs), digital signal processing devices (DSPDs), pro-grammable logic devices (PLDs), field programmable gate arrays (FPGAs), controllers, micro-controllers, micropro-cessors, or other electronic components, for performing the above methods.

In an exemplary embodiment, there is also provided a non-transitory computer readable storage medium including instructions, such as the memory 6004 including the instruc-tions. The instructions may be executed by the processor 6020 in the device 6000 for performing the above wireless communication method. For example, the non-transitory computer readable storage medium may be a ROM, a RAM, a CD-ROM, a magnetic tape, a floppy disc, an optical data storage device, and the like.

In an exemplary embodiment, the disclosure further describes a communication device. The communication device may include a processor, a transceiver, a memory and an executable program stored on the memory and capable of being run by the processor. The processor is configured to implement steps of the wireless communication method according to any one of the above embodiments when running the executable program. In an embodiment of the present disclosure, the communication devices may include devices such as an AP or a STA.

Other implementations of the disclosure will be apparent to the skilled in the art from consideration of the specification and practice of the disclosure disclosed here. This disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It should be understood that the disclosure is not limited to the exaction construction that has been described above and illustrated in the accompanying drawings, and that various combinations, replacements, modifications and changes may be made on the method steps or equipment components disclosed in the disclosure without departing from the scope thereof. These combinations, replacements, modifications and changes are deemed to be included in the scope of the disclosure. The scope of the claimed invention is limited by the appended claims.

What is claimed is:

1. A wireless communication method, performed by a station multi-link device (STA MLD), the method comprising:

sending an initial link set-up message frame on a first link, wherein the initial link set-up message frame is configured to indicate that a sender of the initial link set-up message frame supports a capability of multi-link communication;

receiving one association identifier (AID) on the first link, wherein the one AID indicates all links of the STA;

generating a multi-link set-up request frame, and sending the multi-link set-up request frame on the first link, wherein the multi-link set-up request frame comprises relevant information, and the relevant information comprises the one AID, a bitmap, and at least one media access control (MAC) address corresponding to at least one link between the STA and an access point (AP), wherein each bit of the bitmap corresponds to one link, and a value of each bit is configured to identify whether the corresponding link is to be activated.

2. The method according to claim 1, wherein the multi-link set-up request frame further comprises one of the following:

at least one piece of link identifier information; or at least one piece of link identifier information and at least one MAC address corresponding to the at least one piece of link identifier information; or at least one MAC address corresponding to at least one link identifier.

3. The method according to claim 2, wherein the at least one piece of link identifier information is different from identifier information of the first link.

4. The method according to claim 1, wherein sending the multi-link set-up request frame on a second link or the first link comprises:

sending the multi-link set-up request frame on the first link, wherein the multi-link set-up request frame comprises at least one piece of link identifier information, and does not comprise an MAC address corresponding to the first link.

5. A wireless communication method, performed by an access point multi-link device (AP MLD), the method comprising:

receiving an initial link set-up message frame on a first link; and sending one AID on the first link;

wherein the initial link set-up message frame is configured to indicate that a sender of the initial link set-up message frame supports a capability of multi-link communication, wherein the AID indicates all links between a station (STA) between one AP;

receiving a multi-link set-up request frame on the first link, and setting up multiple links based on the capability of multi-link communication supported by the sender of the initial link set-up message frame, wherein the multi-link set-up request frame comprises relevant information, and the relevant information comprises the one AID, a bitmap, and at least one media access control (MAC) address corresponding to at least one link between the STA and an access point (AP), wherein each bit of the bitmap corresponds to one link, and a value of each bit is configured to identify whether the corresponding link is to be activated.

6. The method according to claim 5, wherein the multi-link set-up request frame further comprises one of the following:

at least one piece of link identifier information; or at least one piece of link identifier information and at least one MAC address corresponding to the at least one piece of link identifier information; or at least one MAC address corresponding to at least one link identifier;

wherein the method further comprises:

setting up multiple links based on the at least one piece of link identifier information, or the at least one piece of link identifier information and the at least one media access control (MAC) address corresponding to the at least one piece of link identifier information in the multi-link set-up request frame.

7. The method according to claim 6, wherein the at least one piece of link identifier information is different from identifier information of the first link.

8. The method according to claim 5, wherein receiving the multi-link set-up request frame on a second link or the first link comprising:

receiving the multi-link set-up request frame on the first link, wherein the initial link set-up message frame comprises at least one piece of link identifier information, and does not comprise an MAC address corresponding to the first link.

9. A communication device, comprising a processor, a transceiver, a memory and an executable program stored on the memory and capable of being run by the processor; wherein the processor is configured to implement:

sending an initial link set-up message frame on a first link, wherein the initial link set-up message frame is configured to indicate that a sender of the initial link set-up message frame supports a capability of multi-link communication;

receiving one association identifier (AID) on the first link, wherein the one AID indicates all links of the communication device;

generating a multi-link set-up request frame, and sending the multi-link set-up request frame on a second link or the first link, wherein the multi-link set-up request frame comprises relevant information, and the relevant information comprises the one AID, a bitmap, and at least one media access control (MAC) address corresponding to at least one link between the STA and an access point (AP), wherein each bit of the bitmap corresponds to one link, and a value of each bit is configured to identify whether the corresponding link is to be activated.

10. The communication device according to claim 9, wherein the multi-link set-up request frame further comprises one of the following:

at least one piece of link identifier information; or at least one piece of link identifier information and at least one MAC address corresponding to the at least one piece of link identifier information; or at least one MAC address corresponding to at least one link identifier.

11. The communication device according to claim 10, wherein the at least one piece of link identifier information is different from identifier information of the first link.

12. The communication device according to claim 9, wherein the processor is configured to implement:

sending the multi-link set-up request frame on the first link, wherein the multi-link set-up request frame comprises at least one piece of link identifier information, and does not comprise an MAC address corresponding to the first link.

\* \* \* \* \*